United States Patent [19]

Nakayama et al.

[11] Patent Number: 4,726,668
[45] Date of Patent: Feb. 23, 1988

[54] ZOOM LENS OF SHORT TOTAL LENGTH

[75] Inventors: Hiroki Nakayama; Yasuhisa Sato; Kouji Oizumi, all of Kanagawa; Yasuyuki Yamada, Tokyo, all of Japan

[73] Assignee: Canon Kabushiki Kaisha, Tokyo, Japan

[21] Appl. No.: 741,634

[22] Filed: Jun. 5, 1985

[30] Foreign Application Priority Data

Jun. 11, 1984 [JP] Japan ............................ 59-119474

[51] Int. Cl.⁴ .............................................. G02B 15/00
[52] U.S. Cl. ...................................... 350/427; 350/477
[58] Field of Search ...................... 350/423, 427, 477

[56] References Cited

U.S. PATENT DOCUMENTS 4,494,828  1/1985  Masumoto et al. ............... 350/427
4,506,958  3/1985  Imai ................................... 350/427

Primary Examiner—Bruce Y. Arnold
Assistant Examiner—P. M. Dzierzynski
Attorney, Agent, or Firm—Toren, McGeady & Associates

[57] ABSTRACT

In the disclosed zoom lens, a positive front lens unit and a negative rear lens unit are moved forwardly axially in differential relation to vary the overall focal length from a minimum to a maximum value, while a positive middle lens unit is kept stationary during the variation of the focal length. A diaphragm determining the F-number is positioned at a fixed point between the front and rear lens units.

9 Claims, 23 Drawing Figures

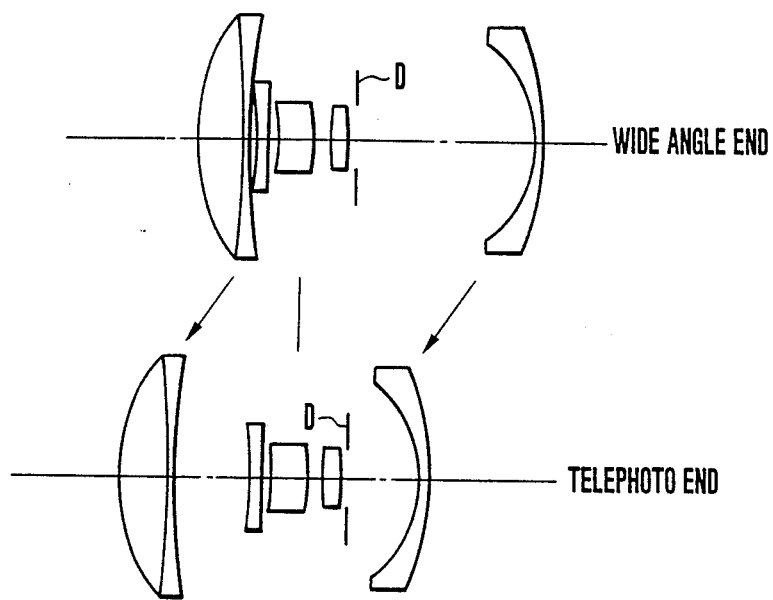
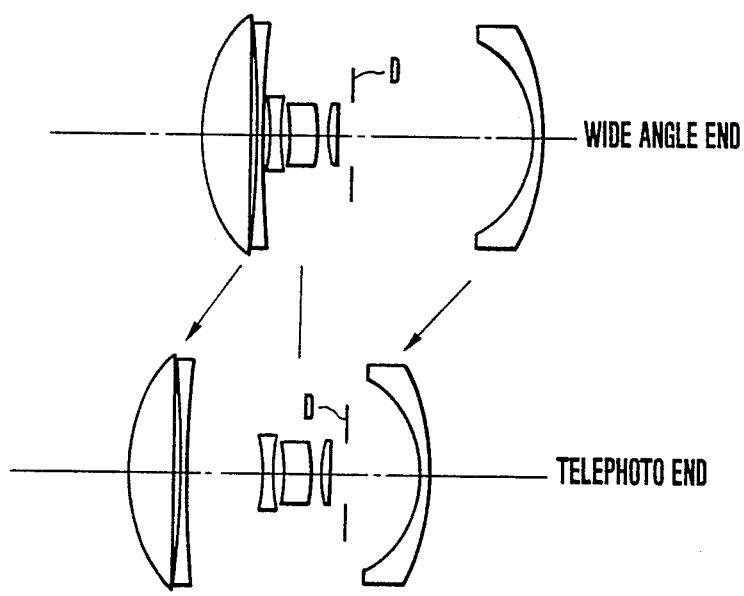

WIDE ANGLE END

TELEPHOTO END

WIDE ANGLE END

TELEPHOTO END

WIDE ANGLE END

TELEPHOTO END

WIDE ANGLE END

TELEPHOTO END

WIDE ANGLE END

TELEPHOTO END

WIDE ANGLE END

TELEPHOTO END

WIDE ANGLE END

TELEPHOTO END

ZOOM LENS OF SHORT TOTAL LENGTH

BACKGROUND OF THE INVENTION

1. Field of the Invention

This invention relates to zoom lenses of small size, and more particularly to zoom lenses of shortened total length (from the front vertex to the image plane) suited to lens-shutter cameras, video cameras, or the like.

2. Description of the Prior Art

Recently, decreases in size of lens-shutter cameras, video cameras, and the like, have created a demand for reductions in the overall lengths of zoom lenses. Also, cameras whose lenses are not interchangeable, such as lens-shutter cameras, often use zoom lenses, and it would be desirable to shorten the total length of such zoom lenses to a value almost equal to that of the hitherto used fixed focal length lenses.

For this purpose, a proposal has been made for a two-unit zoom lens composed, as shown in FIG. 1, of a front lens unit I of positive power and a rear lens unit II of negative power. The separation between units are varied to vary the image magnification. This appears in Japanese Laid-Open Patent Application No. SHO 57-201213.

According to this proposal, the use of positive and negative powers in this order from the front provides a good compromise between the requirements of shortening the lens' back focal distance and of simplifying the construction of the operating mechanism.

Another proposal appears in Japanese Laid-Open Patent Application No. SHO 58-184916. Here, three lens units of positive, positive, and negative refractive powers in sequence from the front form a zoom lens, and all the three lens units are made movable for varying the image magnification.

The above-described two-component zoom lens suffers from the fact that there are only two movable lens units and the total zoom movement must be made relatively long to obtain a desired zoom ratio. In the three-component zoom lens, on the other hand, the three lens units are moved to zoom the lens. However, here the structure of the operating mechanism tends to become complicated.

Another problem common to both of the two- and three-component zoom lenses is that the simultaneous axial movement of the diaphragm during zooming calls for an increase in the complexity of structure of the operating mechanism.

The purpose of reducing the size of the lens is mainly to minimize the bulk and size of the camera as a whole. Yet, a much-desired reduction in the size of the lens may cause an increase in the size of the lens's mounting and its operating mechanism and, therefore, in the diameter and length of the lens's outer barrel. Thus, the lens's size reduction may be meaningless. That is, in reducing the size of the lens, one must consider its influence on the structure of its mechanical mount.

SUMMARY OF THE INVENTION

A first object of the present invention is to provide a zoom lens of reduced total length.

A second object of the present invention is to reduce the total movement of the lens units for zooming, or the number of lens units movable for zooming.

A third object of the present invention is to provide an optical system which enables its operating mechanism to be constructed in simple form.

BRIEF DESCRIPTION OF THE DRAWINGS

FIG. 3 is a longitudinal section view of an example 1 of the zoom lens.

FIG. 5 is a longitudinal section view of example 2 of the zoom lens.

DETAILED DESCRIPTION OF THE PREFERRED EMBODIMENTS

Figure 1:
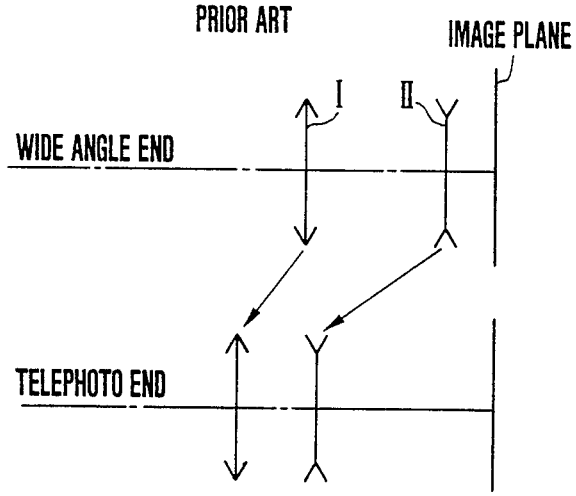
FIG. 1 is a schematic diagram of the optical arrangement of an example of the prior known zoom lens.
Figure 2:
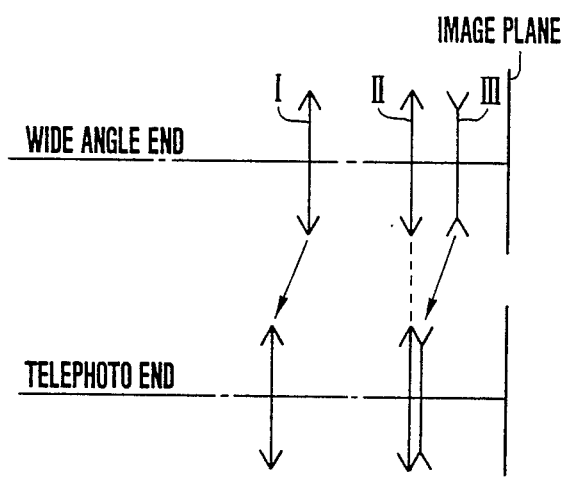
FIG. 2 is a schematic diagram of the optical arrangement of an embodiment of a zoom lens according to the present invention.
Figure 4A:
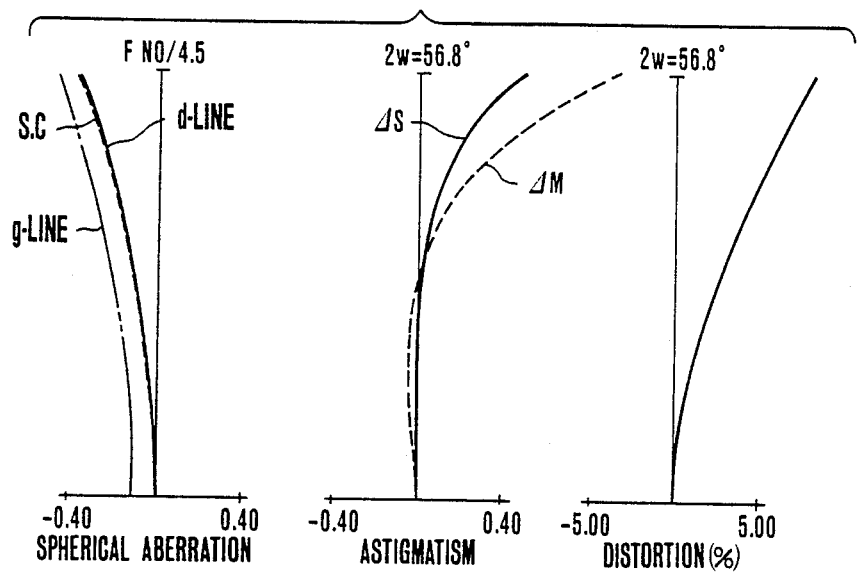
FIGS. 4A and 4B are graphic representations of the aberrations of the lens of FIG. 3.
Figure 4B:
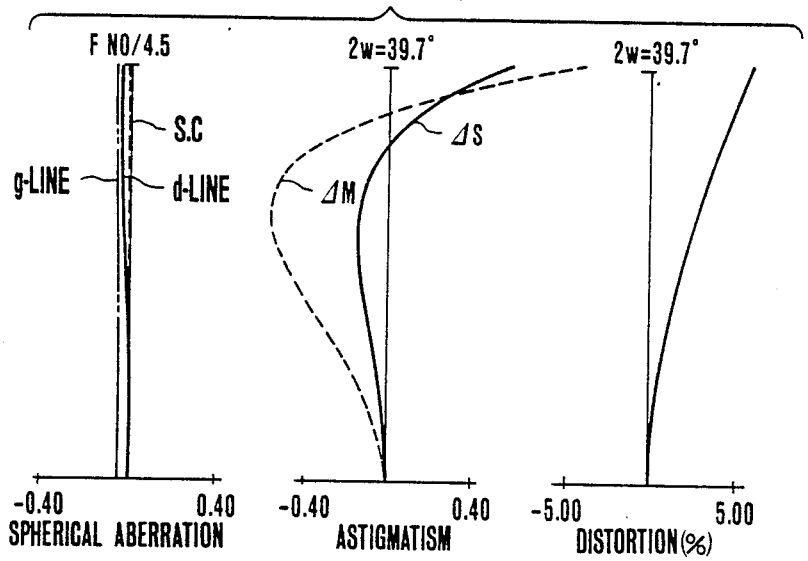
Figure 6A:
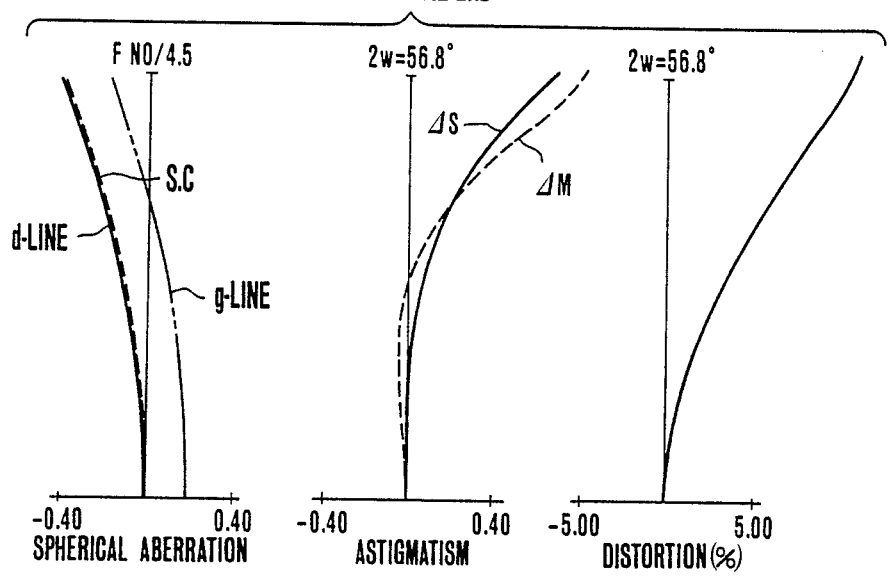
FIGS. 6A and 6B are graphic representations of the aberrations of the lens of FIG. 5.
Figure 6B:
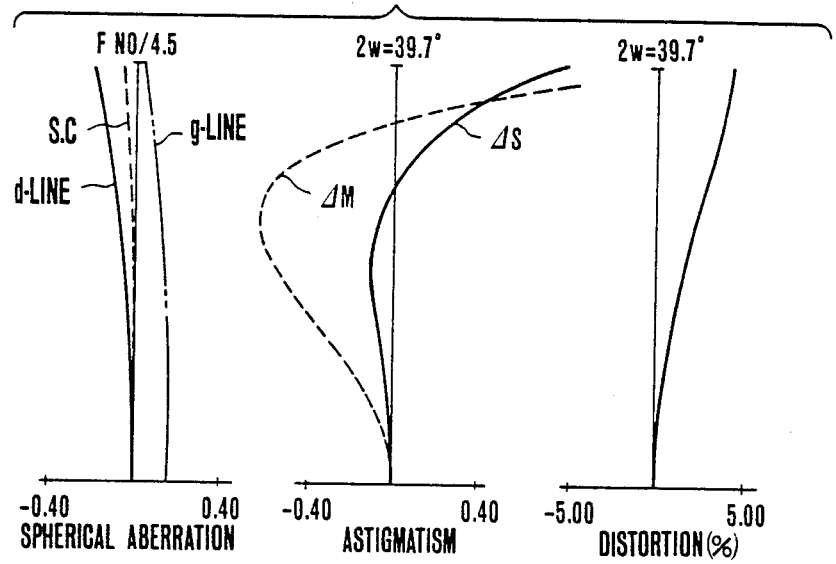
Figure 7:
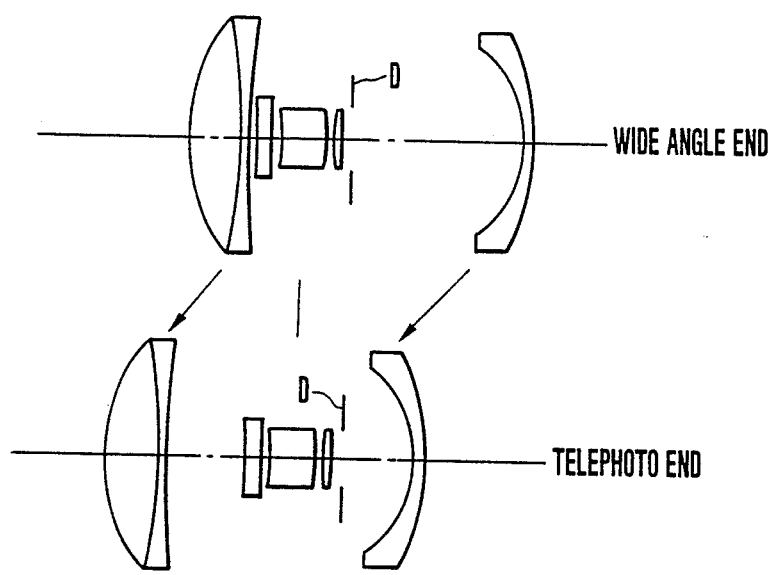
FIG. 7 is a longitudinal section view of example 3 of the zoom lens.
Figure 9:
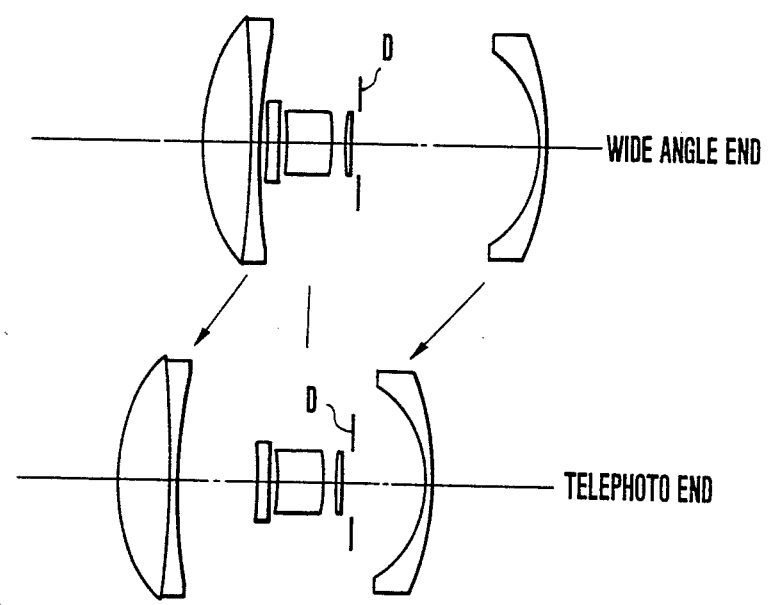
FIG. 9 is a longitudinal section view of example 4 of the zoom lens.
Figure 8A:
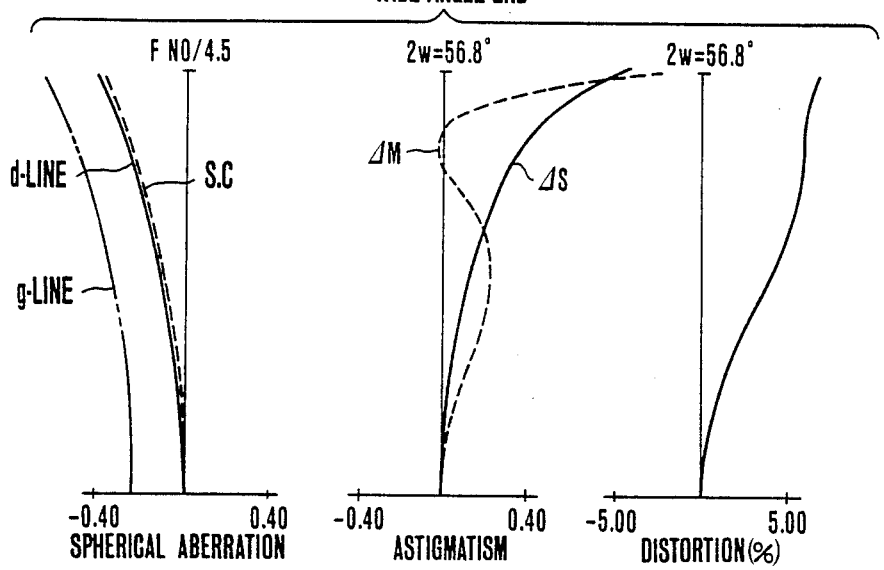
FIGS. 8A and 8B are graphic representations of the aberrations of the lens of FIG. 7.
Figure 8B:
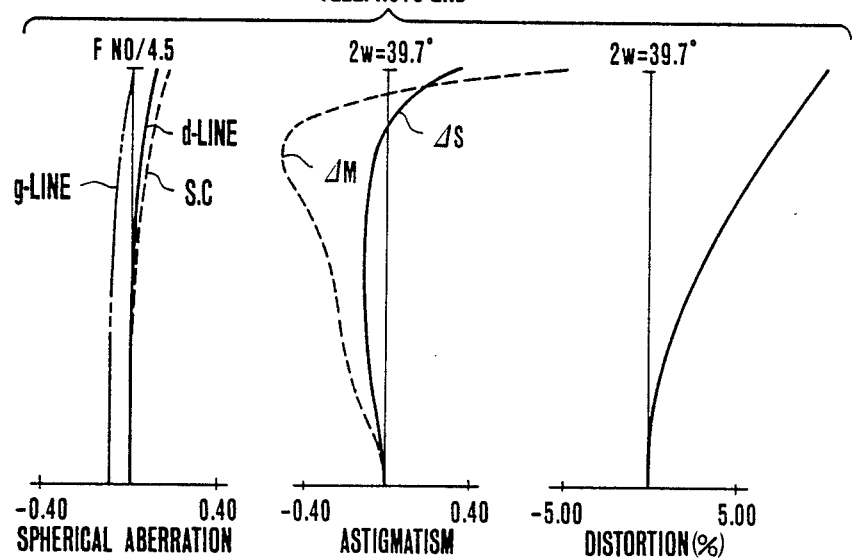
Figure 10A:
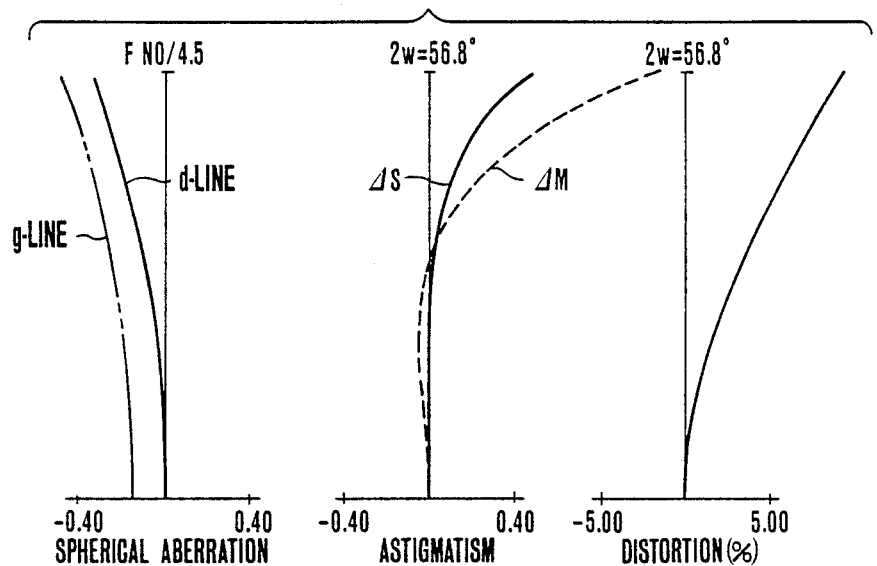
FIGS. 10A and 10B are graphic representations of the aberrations of the lens of FIG. 9.
Figure 10B:
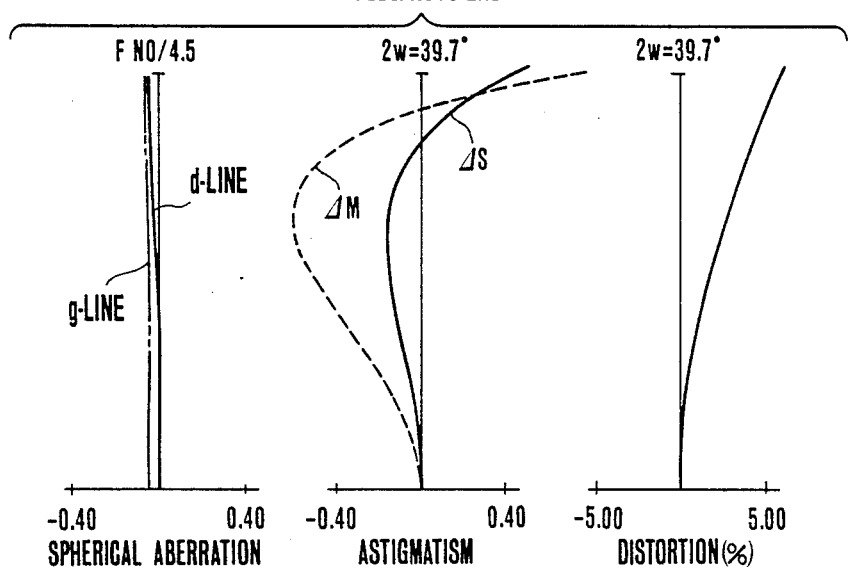
Figure 11:
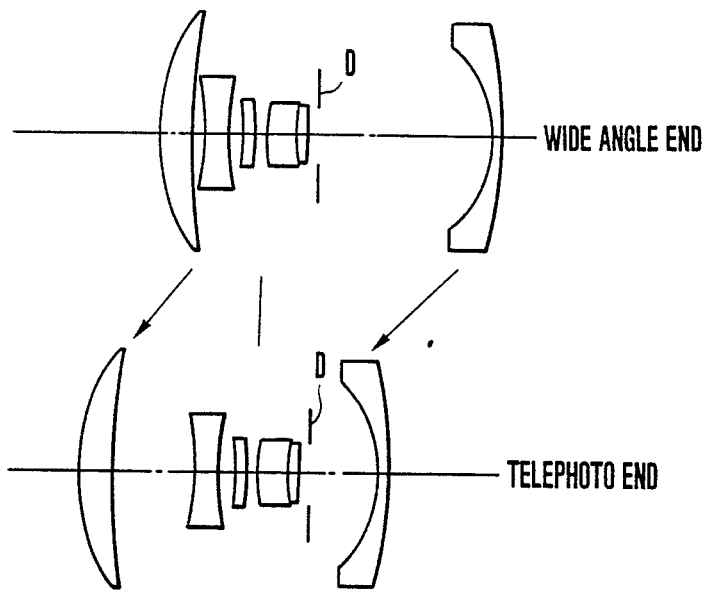
FIG. 11 is a longitudinal section view of example 5 of the zoom lens.
Figure 13:
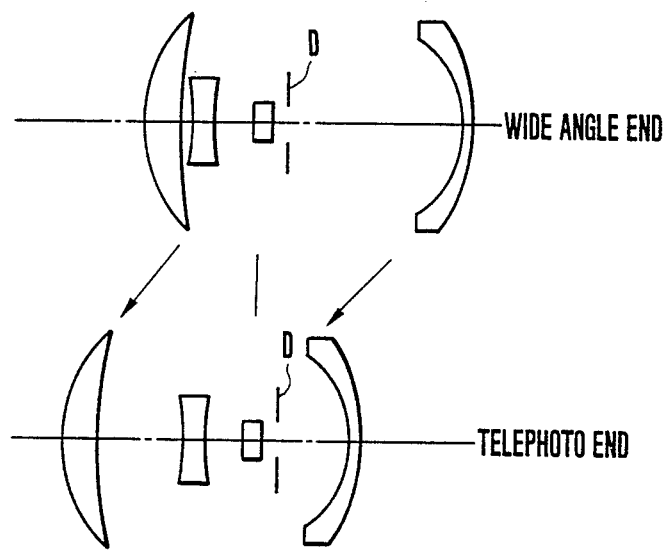
FIG. 13 is a longitudinal section view of example 6 of the zoom lens.
Figure 12A:
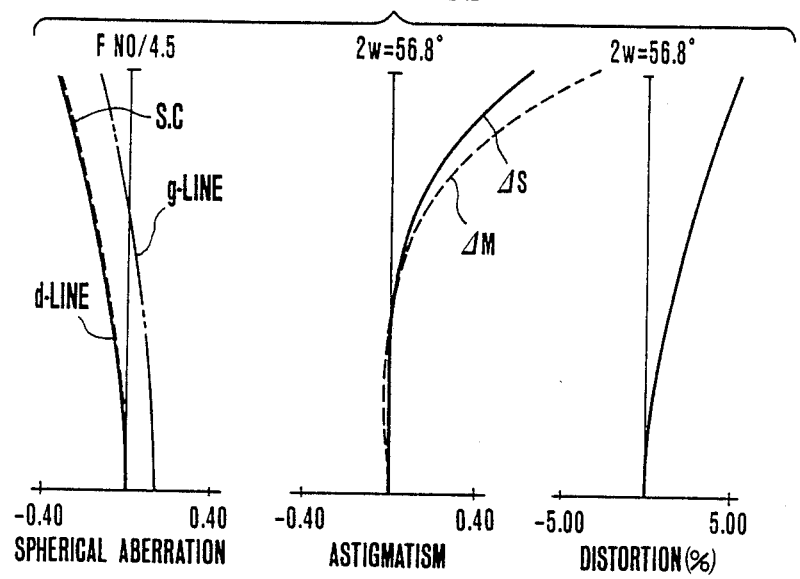
FIGS. 12A and 12B are graphic representations of the aberrations of the lens of FIG. 11.
Figure 12B:
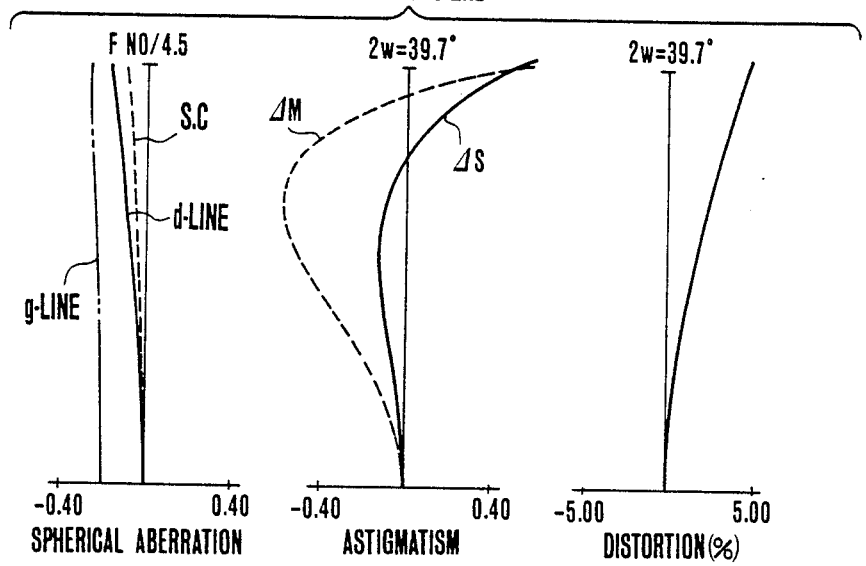
Figure 14A:
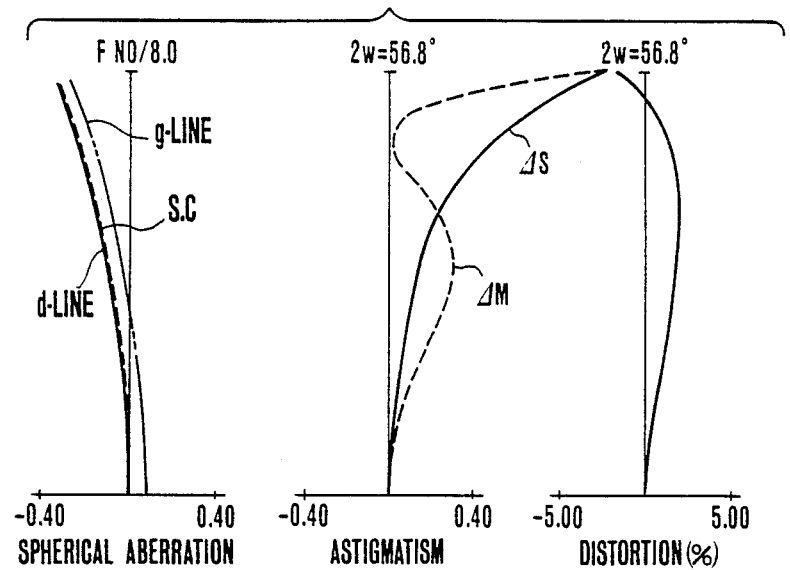
FIGS. 14A and 14B are graphic representations of the aberrations of the lens of FIG. 13.
Figure 14B:
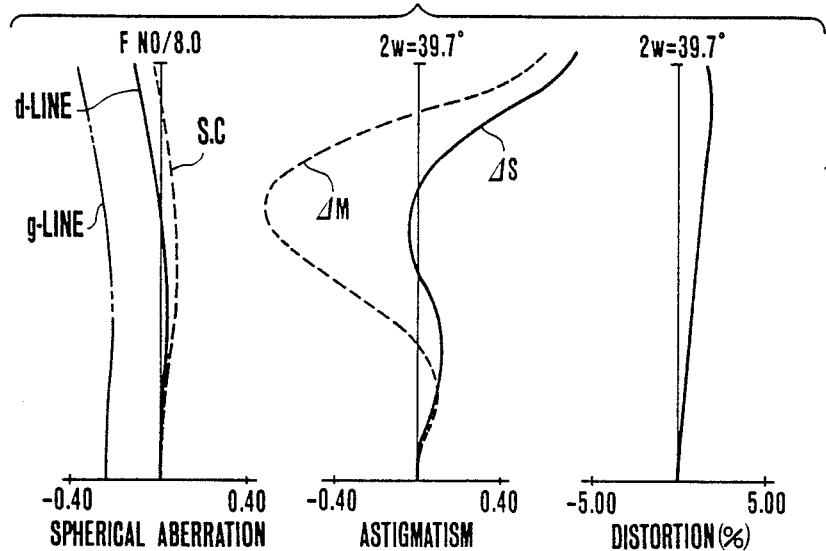
Figure 15:
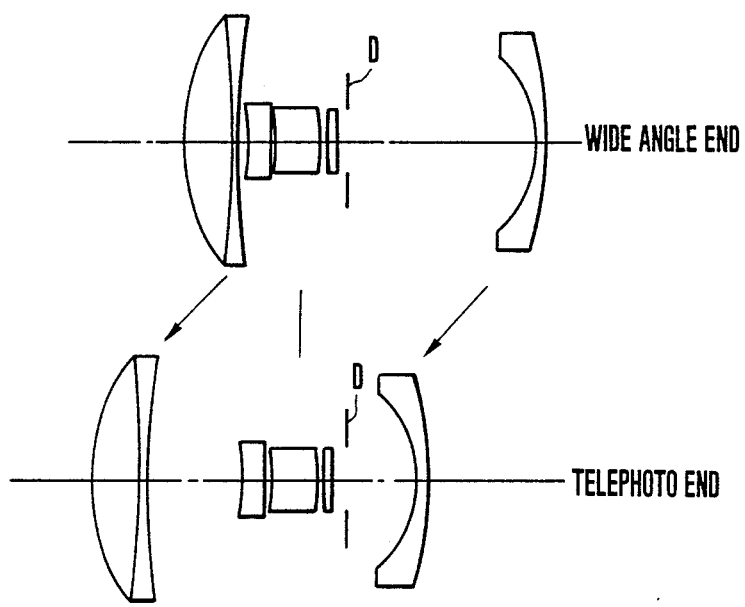
FIG. 15 is a longitudinal section view of example 7 of the zoom lens.
Figure 16A:
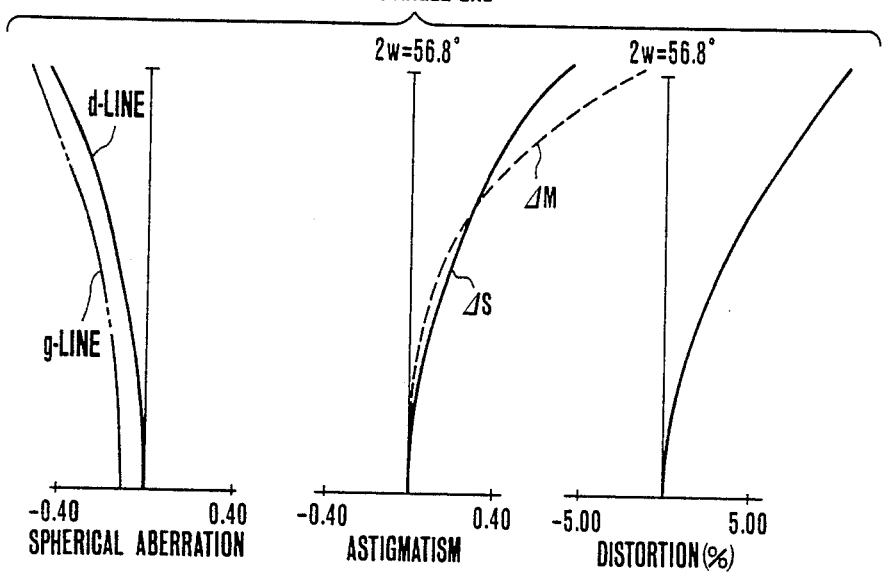
FIGS. 16A and 16B are graphic representations of the aberrations of the lens of FIG. 15.
Figure 16B:
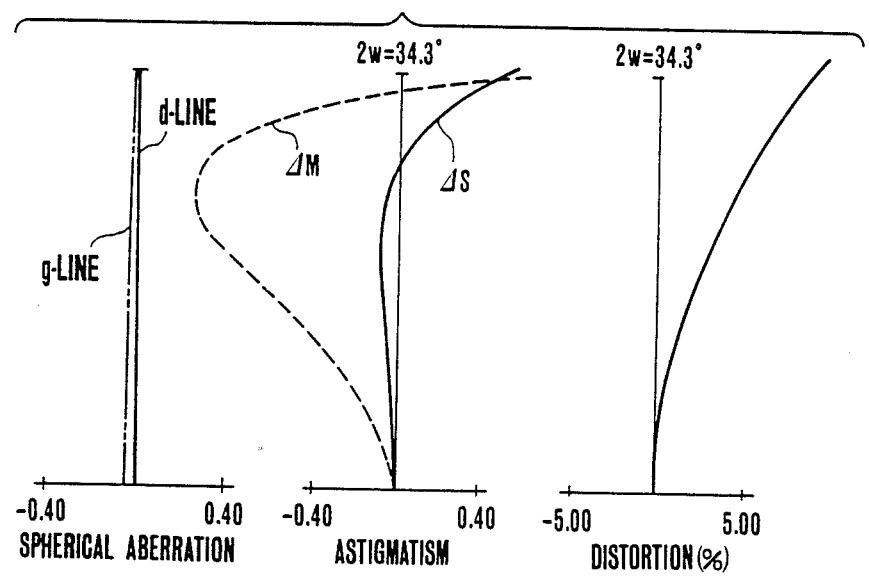

FIG. 2 shows the optical arrangement of an embodiment of the invention in terms of a thin lens system. Here, I, II and III denote respective first (front), second (middle) and third (rear) lens units with their motions during zooming being shown by arrows.

In the present invention, to vary the focal length of the entire system, of the three lens units, two, namely, the first lens unit I and the third lens unit III are made to move independently of each other, while the second lens unit II which often contains the diaphragm is held stationary during zooming. This offers the advantage of simplifying the structure of construction of an operating mechanism.

Another feature of the invention is that as zooming from the short focal length to the long focal length end, the lateral magnification $\beta 2$ of the second lens unit II and the lateral magnification $\beta 3$ of the third lens unit III both continuously increase. Hence, the range of variation of the focal length is advantageously extended.

Still another feature is that the overall refractive power of the second and third lens units II and III is made negative, and that the negative power becomes gradually stronger as the focal length increases. This provides a much-described reduction in the total zooming movement for the prescribed zoom ratio.

When the above-stated features or conditions are satisfied, the objects of the invention to minimize the size of the zoom lens are accomplished. But, for more improved results, the above-stated various conditions may be specified as follows:

$$1.0 < \beta 2T/\beta 2W < 1.5 \quad (1)$$

$$1.0 < \beta 3T/\beta 3W < 1.7 \quad (2)$$

where $\beta 2W$ and $\beta 2T$ are the lateral magnifications of the second lens unit II in the wide angle and telephoto ends respectively, and $\beta 3W$ and $\beta 3T$ are those of the third lens unit III.

With this, the requirement of obtaining the desired zoom ratio can be fulfilled in good balance with the maintenance of the aberrations stable over the entire zooming range.

When the upper limits of inequalities of conditions (1) and (2) are exceeded, the zoom ratio becomes too large with an excessive refractive power of each lens unit or an excessive total zooming movement to minimize the variation of the aberrations with zooming.

When the lower limits of inequalities of conditions (1) and (2) are exceeded, it becomes very difficult to design a zoom lens of the required optical performance. Particularly with the use of only two lens units movable for zooming, the magnification increase ratios are too small to obtain the given zoom ratio.

Further, in the present invention, the following range preferably prevails for the overal refractive powers $\phi 23W$ and $\phi 23T$ of the second and third lens units II and III in the wide angle and telephoto ends respectively.

$$1.2 < \phi 23T/\phi 23W < 4.0 \quad (3)$$

Employing such a refractive power arrangement, makes it possible to obtain the prescribed zoom ratio easily without having to unduly largely increase the total movement of the third lens unit III.

In this connection it should be explained that the equation for the overall refractive power $\phi 23$ of the second and third lens units II and III may be expressed as:

$$\phi 23 = \frac{1}{f2} + \frac{1}{f3} - \frac{e2}{f2f3} \quad (a)$$

where f2 and f3 are the focal lengths of the second and third lens units II and III respectively, and e2 is the interval between the principal points of the second and third lens units II and III. Here, because $1/f2 > 0$ and $1/f3 < 0$, the values of the focal length of these lens units can be chosen so that $1/f2 + 1/f3 < 0$. With this, when the e2 is decreased during zooming from the wide angle to the telephoto end, or when the third lens unit III is moved toward the front, the refractive power $\phi 23$ can be increased in the negative sense. For this reason, the refractive power $\phi 23$ in the telephoto end can be taken at a maximum value of negative sign. As a result, by slightly moving the third lens unit III, a high zoom ratio can readily be obtained.

Improved results are attained by employing the above-stated rules for the lens units of the zoom lens. However, in order to achieve a further improvement of stabilization of the aberration correction throughout the entire range of variation of the focal length with the limitation of the size of the entire system to a minimum, one should preferably satisfy the following various conditions:

$$0.3fW < f1 < 5fW \quad (4)$$

$$-2.5fW < f3 < -0.5fW \quad (5)$$

$$e12W > -0.5fW \quad (6)$$

$$e23T > -0.4fW \quad (7)$$

wherein f1 and f3 are the focal lengths of the first and third lens units I and III respectively, fW is the shortest focal length of the entire system, e12W is the interval between the principal points of the first and second lens units I and II when in the wide angle end, and e23T is the interval between the principal points of the second and third lens units II and III when in the telephoto end.

Inequalities of condition (4) represent a range of refractive powers of the first lens unit I. When the lower limit is exceeded, in order to obtain the given zoom ratio, the refractive powers of the second and third lens unit must take large values of positive and negative signs respectively. Therefore, the Petzval sum increases largely in the negative sense with over-correction of field curvature. Conversely when the upper limit is exceeded, not only the first lens unit I has a small contribution to the variation of the focal length, but also the lateral magnification $\beta 3$ of the third lens unit III must be decreased with decrease in the refractive power thereof. As a result, the total zooming movement of the third lens unit III increases, causing the total length of the lens system to increase objectionably.

Inequalities of condition (5) represent a range of refractive power of the third lens unit III. When the upper limit is exceeded, the refractive power increases in the negative sense, causing the Petzval sum to increase in the negative sense with increase of the field curvature to the positive direction. When the lower limit is exceeded, the overall refractive power of it and the second lens unit II approaches the positive direction so that as has been stated above, the short total zooming movement of the third lens unit III does not suffice for obtaining the high zoom ratio. When the lower limit is exceeded, or the overall refractive power is increased in the negative sense beyond the lower limit, in order to obtain the prescribed zoom ratio, the above-described equation (a) tells that the positive refractive power of the second lens unit II weakens. Therefore, the interval e2 between the principal points of the second and third lens units II and III must be decreased. This makes it impossible to create a space in which the third lens unit III moves.

Inequalities of conditions (6) and (7) are given for proper separations between the successive two lens units to achieve a shortening of the total length of the lens. When beyond the limits of the inequalities of conditions (6) and (7), either of the separations in the wide angle and telephoto ends becomes too narrow to avoid the mechanical interference between the adjacent two of the lens units.

As for the focal length f2 of the second lens unit II which remains stationary during zooming, it is in the present invention that a proper range to assist in heightening the effect of varying the focal length by moving the first and third lens units I and III while still permitting good correction of the image aberrations over the entire area of the picture frame to be stabilized against zooming, is found as:

$$0.5fW < f2 < 6fW \quad (8)$$

When the upper limit of the inequalities of condition (8) is exceeded, as the refractive power of the second lens unit II weakens, the prescribed zoom ratio is, according to the aforesaid equation (a), secured by increasing the interval e2 bwtween the principal points of the second and third lens units II and III. In addition thereto, as the negative refractive power of the third lens unit III weakens, its total zooming movement must be increased. When the lower limit is exceeded, as the refractive power of the second lens unit II becomes strong, the negative refractive power of the third lens unit III must be excessively increased, and the interval between the principal points of the second and third lens units II and III must be decreased thereby the required zooming movement cannot be formed.

A further feature of the invention is that since the third lens unit III moves to effect zooming, it is preferably constructed in the form of a meniscus-shaped lens of negative power convex toward the rear. Hence, the imaging characteristics are well corrected over the entire area of the picture frame and maintained stable throughout the entire zooming range.

A further feature of the invention is that since the first and third lens units I and III move to effect zooming, to minimize the range of variation of the aberrations with zooming and to make the well-corrected various aberrations uniform over the entire area of the picture frame, the radii of curvature R11 and R31 of the first surfaces counting from front of the first and third lens units I and III respectively lie preferably within the following ranges:

$$0.5fW < R11 < fW \quad (9)$$

$$-0.6fW < R31 < -0.2fW \quad (10)$$

The inequalities of conditions (9) and (10) are for good stability of the spherical aberration throughout the entire zooming range and for good correction of the field curvature over the entire area of the picture frame. When the upper limit of the inequalities of condition (9) and the lower limit of the inequalities of condition (10) are exceeded, over-correction of spherical aberration results and the field curvature in the wide angle positions is objectionably increased in the negative direction. When the lower limit of condition (9) and the upper limit of condition (10) are exceeded, under-correction of spherical aberration results and the field curvature is objectionably increased to the positive direction.

It should be pointed out that in the present invention the front surface of the third lens unit III is preferably made aspherical to achieve a further improvement of the aberration correction for a higher grade of imaging performance.

Focusing of the zoom lens of the invention can be performed by moving the entire system as a whole. But other methods may be employed to move either the first or the second lens unit I or II forward, or to move the third lens unit III rearward, or to move the first and second lens units I and II forward at the same speed. It is also to be noted that though in the examples to be described below, the diaphragm D that determines the F-number is positioned just behind the second lens unit II, it is also possible to put it in a space within the lens unit, or in front thereof.

As has been described above, according to the present invention, a zoom lens of reduced size which enables its operating mechanism to be constructed in a simple form while preserving the high zoom ratio can be realized.

Examples of specific zoom lenses of the invention can be constructed in accordance with the numerical data for the radii of curvature, R, the axial thicknesses or air separations, D, and the refractive indices, N, and Abbe numbers, $\nu$, of the glasses of the various lens elements with the subscripts numbered consecutively from front to rear.

Using a co-ordinate with its X-axis in the optical axis, its Y-axis in a direction perpendicular to the optical axis, and taking the direction in which light advances as positive, and the original point at the vertex, the equation for the aspherical surface is expressed by:

$$X = \frac{(1/R)Y^2}{1 + \sqrt{1 - (Y/R)^2}} + a1 \cdot Y^2 + a2 \cdot Y^4 + a3 \cdot Y^6 +$$

$$a4 \cdot Y^8 + a5 \cdot Y^{10} + b1 \cdot Y^3 + b2 \cdot Y^5 + b3 \cdot Y^7 + b4 \cdot Y^9$$

where R is the radius of curvature of the paraxial region of the lens surface, and a1, a2, a3, a4, a5, b1, b2, b3 and b4 are aspherical coefficients.

Also, for example [D-03] stands for $10^{-3}$.

EXAMPLE 1

(FIGS. 3, 4A, 4B)

| F = 40.0–60.0 | FNO = 1:4.5 | $2\omega$ = 39.7°–56.8° | |
|---|---|---|---|
| R1 = 26.02 | D1 = 6.61 | N1 = 1.75500 | $\nu$1 = 52.3 |
| R2 = −188.79 | D2 = 0.88 | N2 = 1.84666 | $\nu$2 = 23.9 |
| R3 = 113.33 | D3 = 0.94–10.70 | | |
| R4 = −46.03 | D4 = 1.49 | N3 = 1.75520 | $\nu$3 = 27.5 |
| R5 = 409.48 | D5 = 1.36 | | |
| R6 = −19.36 | D6 = 5.10 | N4 = 1.77250 | $\nu$4 = 49.6 |
| R7 = −20.98 | D7 = 1.98 | | |
| R8 = 43.71 | D8 = 2.22 | N5 = 1.69350 | $\nu$5 = 53.2 |
| R9 = −74.73 | D9 = 25.17–10.09 | | |
| R10 = −16.442 | D10 = 1.20 | N6 = 1.77250 | $\nu$6 = 49.6 |
| R11 = −39.541 | | | |

EXAMPLE 2

(FIGS. 5, 6A, 6B)

| F = 40.0–60.0 | FNO = 1:4.5 | $2\omega$ = 39.7°–56.8° | |
|---|---|---|---|
| R1 = 23.28 | D1 = 6.30 | N1 = 1.64000 | $\nu$1 = 60.1 |
| R2 = 2446.53 | D2 = 0.82 | | |
| R3 = −245.56 | D3 = 1.03 | N2 = 1.84666 | $\nu$2 = 23.9 |
| R4 = 328.42 | D4 = 0.94–10.7 | | |
| R5 = −25.77 | D5 = 1.49 | N3 = 1.75520 | $\nu$3 = 27.5 |
| R6 = 89.82 | D6 = 1.31 | | |
| R7 = −22.38 | D7 = 3.77 | N4 = 1.77250 | $\nu$4 = 49.6 |
| R8 = −17.87 | D8 = 1.25 | | |
| R9 = 30.52 | D9 = 1.26 | N5 = 1.69350 | $\nu$5 = 53.2 |
| R10 = −96.840 | D10 = 26.55–12.47 | | |
| R11 = −14.030 | D11 = 1.12 | N6 = 1.69680 | $\nu$6 = 56.5 |
| R12 = −31.502 | | | |

EXAMPLE 3
(FIGS. 7, 8A, 8B)

| F = 40.0–60.0 | FNO = 1:4.5 | 2ω = 39.7°–56.8° | |
|---|---|---|---|
| R1 = 28.82 | D1 = 7.18 | N1 = 1.75500 | ν1 = 52.3 |
| R2 = −80.82 | D2 = 1.16 | N2 = 1.84666 | ν2 = 23.9 |
| R3 = 235.19 | D3 = 0.96–10.7 | | |
| R4 = −75.34 | D4 = 2.02 | N3 = 1.75520 | ν3 = 27.5 |
| R5 = 1366.95 | D5 = 1.36 | | |
| R6 = −17.11 | D6 = 6.39 | N4 = 1.77250 | ν4 = 49.6 |
| R7 = −20.91 | D7 = 0.76 | | |
| R8 = 102.44 | D8 = 1.21 | N5 = 1.69350 | ν5 = 53.2 |
| R9 = −45.27 | D9 = 25.7–11.6 | | |
| *R10 = −16.699 | D10 = 1.18 | N6 = 1.77250 | ν6 = 49.6 |
| R11 = −34.715 | | | |

Aspherical Coefficients (the 10th Surface)

| a1 = −2.302D-03, | a2 = −1.810D-05, |
|---|---|
| a3 = 1.198D-07, | a4 = −4.546D-11, |
| a5 = 4.069D-16 | |
| b1 = 3.496D-05, | b2 = −2.836D-06, |
| b3 = 2.487D-08, | b4 = −6.322D-11 |

EXAMPLE 4
(FIGS. 9, 10A, 10B)

| F = 40.0–60.0 | FNO = 1:4.5 | 2ω = 39.7°–56.8° | |
|---|---|---|---|
| R1 = 25.61 | D1 = 6.93 | N1 = 1.75500 | ν1 = 52.3 |
| R2 = −140.19 | D2 = 1.10 | N2 = 1.84666 | ν2 = 23.9 |
| R3 = 106.68 | D3 = 0.97–10.7 | | |
| R4 = −54.72 | D4 = 1.50 | N3 = 1.75520 | ν3 = 27.5 |
| R5 = 853.70 | D5 = 1.10 | | |
| R6 = −19.43 | D6 = 6.26 | N4 = 1.77250 | ν4 = 49.6 |
| R7 = −20.99 | D7 = 1.55 | | |
| R8 = 42.47 | D8 = 0.71 | N5 = 1.69350 | ν5 = 53.2 |
| R9 = −136.78 | D9 = 25.3–11.2 | | |
| R10 = −15.924 | D10 = 1.17 | N6 = 1.77250 | ν6 = 49.6 |
| R11 = −36.761 | | | |

EXAMPLE 5
(FIGS. 11, 12A, 12B)

| F = 40.0–60.0 | FNO = 1:4.5 | 2ω = 39.7°–56.8° | |
|---|---|---|---|
| R1 = 24.81 | D1 = 5.16 | N1 = 1.69680 | ν1 = 56.5 |
| R2 = 105.18 | D2 = 1.92–11.68 | | |
| R3 = −24.06 | D3 = 2.99 | N2 = 1.75520 | ν2 = 27.5 |
| R4 = 50.47 | D4 = 2.06 | | |
| R5 = −28.66 | D5 = 2.02 | N3 = 1.69680 | ν3 = 56.5 |
| R6 = −17.82 | D6 = 1.15 | | |
| R7 = 26.95 | D7 = 4.36 | N4 = 1.84666 | ν4 = 23.9 |
| R8 = 29.63 | D8 = 1.71 | N5 = 1.51823 | ν5 = 59.0 |
| R9 = −38.99 | D9 = 25.26–11.2 | | |
| R10 = −16.233 | D10 = 1.18 | N6 = 1.60311 | ν6 = 60.7 |
| R11 = −59.982 | | | |

EXAMPLE 6
(FIGS. 13, 14A, 14B)

| F = 40.0–60.0 | FNO = 1:8.0 | 2ω = 39.7°–56.8° | |
|---|---|---|---|
| R1 = 24.19 | D1 = 4.63 | N1 = 1.72600 | ν1 = 53.5 |
| R2 = 83.60 | D2 = 1.70–11.46 | | |
| R3 = −32.18 | D3 = 2.98 | N2 = 1.75520 | ν2 = 27.5 |
| R4 = 49.22 | D4 = 5.16 | | |
| R5 = 28.72 | D5 = 2.97 | N3 = 1.69350 | ν3 = 53.2 |

-continued

| F = 40.0–60.0 | FNO = 1:8.0 | 2ω = 39.7°–56.8° | |
|---|---|---|---|
| R6 = −34.40 | D6 = 26.8–12.7 | | |
| *R7 = −13.30 | D7 = 1.09 | N4 = 1.69350 | ν4 = 53.2 |
| R8 = −29.41 | | | |

Aspherical Coefficients (the 7th Surface)

| a1 = 6.971D-04, | a2 = 6.104D-05, |
|---|---|
| a3 = 7.483D-08, | a4 = 1.867D-10, |
| a5 = 2.408D-11 | |
| b1 = −2.324D-04, | b2 = −2.529D-06, |
| b3 = 5.996D-09, | b4 = −1.685D-10 |

EXAMPLE 7
(FIGS. 15, 16A, 16B)

| F = 40.0–60.0 | FNO = 1:4.5 | 2ω = 34.3°–56.8° | |
|---|---|---|---|
| R1 = 26.88 | D1 = 6.83 | N1 = 1.75500 | ν1 = 52.3 |
| R2 = −162.44 | D2 = 0.96 | N2 = 1.84666 | ν2 = 23.9 |
| R3 = 133.52 | D3 = 0.94–12.98 | | |
| R4 = −28.47 | D4 = 3.18 | N3 = 1.75520 | ν3 = 27.5 |
| R5 = −113.09 | D5 = 0.73 | | |
| R6 = −24.69 | D6 = 6.19 | N4 = 1.77250 | ν4 = 49.6 |
| R7 = −22.95 | D7 = 0.55 | | |
| R8 = 69.06 | D8 = 1.44 | N5 = 1.69350 | ν5 = 53.2 |
| R9 = −60.97 | D9 = 25.93–10.66 | | |
| R10 = −16.69 | D10 = 1.18 | N6 = 1.77250 | ν6 = 49.6 |
| R11 = −61.46 | | | |

What is claimed is:

1. A zoom lens comprising:
   a front lens unit of positive refractive power;
   a middle lens unit of positive refractive power arranged on an image side of said front lens unit; and
   a rear lens unit of negative refractive power arranged on the image side of said middle lens unit, said front lens unit and said rear lens unit being simultaneously movable forward along an optical axis while said middle lens unit is held stationary to vary an overall focal length from a minimum to a maximum, wherein a lateral magnification ($\beta 2$) of said middle lens unit and a lateral magnification ($\beta 3$) of said rear lens unit increase continuously as the focal length increases.

2. A zoom lens according to claim 1, wherein both of said lateral magnifications vary within such ranges as to satisfy:

$$1.0 < \beta 2T/\beta 2W < 1.5$$

$$1.0 < \beta 3T/\beta 3W < 1.7$$

wherein $\beta 2W$ and $\beta 2T$ are the lateral magnifications of said middle lens unit for the minimum and maximum focal lengths respectively, and $\beta 3W$ and $\beta 3T$ are those of said rear lens unit.

3. A zoom lens comprising:
   a front lens unit of positive refractive power;
   a middle lens unit of positive refractive power arranged on an image side of said front lens unit; and
   a rear lens unit of negative refractive power arranged on the image side of said middle lens unit, said front lens unit and said rear lens unit being simultaneously movable forward along an optical axis while said middle lens unit is held stationary to vary an overall focal length from a minimum to a maximum, wherein an overall refractive power $\psi$ of said middle lens unit and said rear lens unit always takes a negative value despite variation of the focal length, and the negative value increases as the focal length becomes longer.

4. A zoom lens according to claim 3, satisfying the following condition:

$$1.2 < \phi T/\phi W < 4.0$$

wherein $\phi W$ and $\phi T$ are the overall refractive powers for the minimum and maximum focal lengths respectively.

5. A zoom lens comprising:
a front lens unit of positive refractive power;
a middle lens unit of positive refractive power arranged on an image side of said front lens unit; and
a rear lens unit of negative refractive power arranged on the image side of said middle lens unit, said front lens unit and said rear lens unit being simultaneously movable forward along an optical axis while said middle lens unit is held stationary to vary an overall focal length from a minimum to a maximum, in which said zoom lens satisfies the following conditions:

$$0.3 fW < f1 < 5fW$$

$$-2.5 fW < f3 < -0.15 fW$$

$$e12W > -0.5 fW$$

$$e23T > -0.4 fW$$

wherein f1 and f3 are focal lengths of said front and said rear lens units, respectively, fW is the maximum overall focal length, e12W is an interval between principal points of said front and said middle lens units when the overall focal length is the minimum, and e23T is an interval between principal points of said middle and said rear lens units when the overall focal length is the maximum.

6. A zoom lens according to claim 5, satisfying the following condition:

$$0.5 fW < f2 < 6fW$$

wherein f2 is the focal length of said middle lens unit.

7. A zoom lens according to claim 5, satisfying the following conditions:

$$0.5 fW < R11 < fW$$

$$-0.6 fW < R31 < -0.2 fW$$

wherein R11 is a radius of curvature of a frontmost lens surface of said front lens unit and R31 is a radius of curvature of a frontmost lens surface of said rear lens unit.

8. A zoom lens according to claim 5, wherein said rear lens unit consists of a negative meniscus lens of rearward convexity.

9. A zoom lens according to claim 5, wherein said middle lens unit includes a negative lens and a positive lens independent of each other.

* * * * *